July 8, 1969     A. B. COMPTON ET AL     3,453,773
SELF-DRIVING ROLLING DEVICE
Filed Aug. 26, 1965
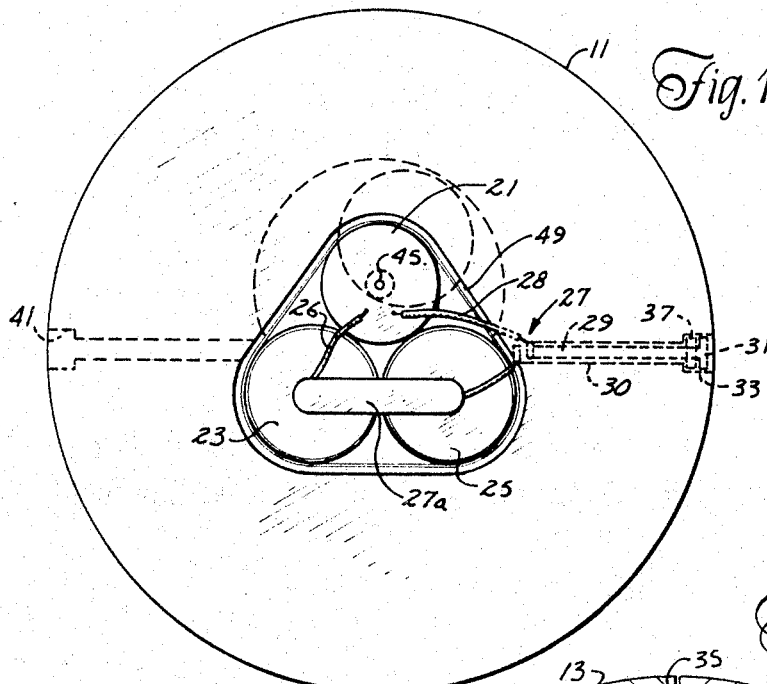
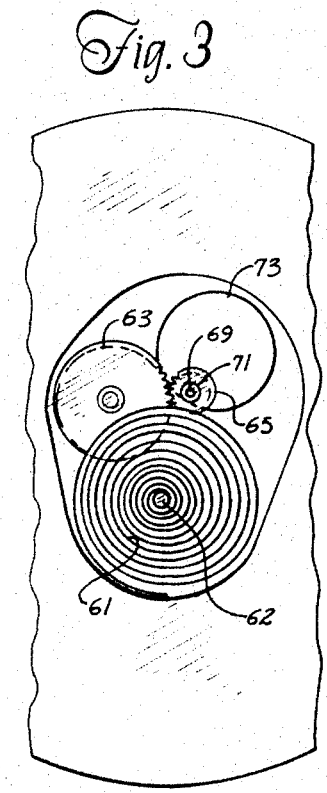
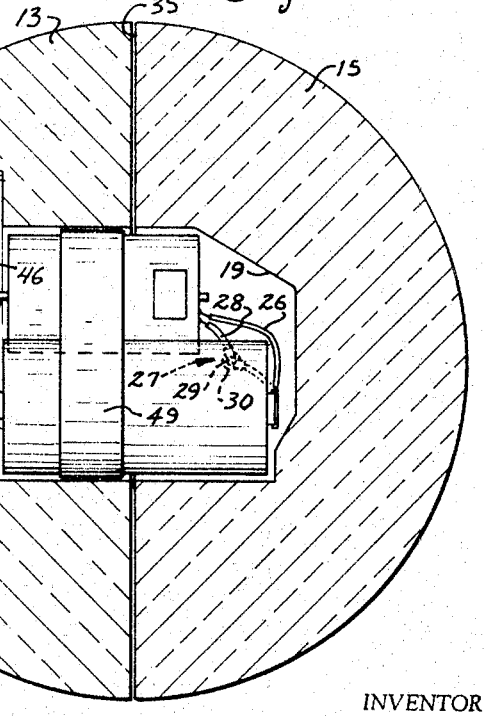
INVENTOR
ASA B. COMPTON
MORRIS D. MUSIG
BY
ATTORNEY United States Patent Office 3,453,773
Patented July 8, 1969

3,453,773
SELF-DRIVING ROLLING DEVICE
Asa B. Compton, Spencerville, Md., and Morris D. Musig, Falls Church, Va., assignors, by mesne assignments, to KMS Industries, Inc., Ann Arbor, Mich., a corporation of Delaware
Filed Aug. 26, 1965, Ser. No. 482,813
Int. Cl. A63h 29/22, 33/00
U.S. Cl. 46—243    9 Claims

ABSTRACT OF THE DISCLOSURE

A self rolling device, such as a ball or roller, is driven indirectly by energetic vibrations caused by driving an eccentrically mounted weight inside the device at high speed, with a substantial moment of inertia. The weight is mounted on a shaft rotatable by a prime mover such that the shaft rotates both with respect to the prime mover and the rolling device.

---

In the prior art there are many self-driving wheels and balls, i.e. cylindrical or spherical devices having an internal source of energy and kinematic elements designed to impart rolling motion to the ball. Some use spring-wound motors; some are electrically driven. Some provide for straightforward motion by driving through transverse axle or pintle means secured at more or less diametrically opposed points of the wheel or ball structure. In such devices, the drive motor or an eccentric weight, or both, are suspended below the transverse axis. As the motor imparts driving motion, e.g. through a worm and gear or a spur gear train, or equivalent, there is a force applied having a tendency to swing the eccentric weight up around the transverse axis. The reaction to this force causes the wheel or ball to roll.

In other balls, wheels and related amusement devices of the prior art, more complex direction controlling mechanisms are sometimes provided to cause the device to change direction, to back up or reverse itself on encountering an obstacle, etc. Some of these mechanisms impart interesting and unusual motions to the ball, but they usually involve complex drives and controls and they often prove to be unreliable as well as expensive. Such devices therefore are not very satisfactory for long sustained amusement, display or analogous uses.

As contrasted with the foregoing, the present invention involves a remarkable simple drive mechanism. It is free completely of gear trains, and of direction changing mechanisms, etc. The invention makes new use of a well known principle involving impulses of rotary motion derived from a rapidly rotating eccentrically loaded body. This eccentrically loaded body is not to be confused with those eccentric weights or structures which assume a generally fixed or perhaps gently oscillating position below the axis of rotation of a mobile ball, wheel, or similar device. By contrast, the eccentrically loaded bodies of the present invention are relatively heavy, compared to the weight of the ball itself, e.g. they may weight almost as much as the ball, exclusive of drive mechanism, or even more. Based on total weight, including drive mechanisms, they may weigh from 5%, preferably at least 10%, to as much as 40% or more of the whole device. In addition, they are driven quite rapidly, e.g., of the order of several, usually dozens or even hundreds of revolutions, per second. Hence they impart a relatively severe agitation to the whole rolling structure. Their radius of gyration and moment of inertia around the axis of rotation are sufficiently large that the reaction to the eccentric rotation imparts impulses of vibrations of substantial amplitude to the whole device. As a result, the ball "goes crazy," i.e., moves at varying rates, sometimes quite rapidly, in completely unpredictable paths. It becomes a highly energetic and entertaining device. Its motions are often quite spectacular and sometimes almost fantastic.

For example, a light weight ball or sphere, made of a foamed plastic material, is provided with a small battery operated motor. The motor-battery unit is located preferably at the approximate center of gravity of the sphere, i.e., at or near its geometrical center. An eccentric weight, having an eccentricity of, say, ⅜ inch, and weighing almost as much as the ball itself (not including batteries and motor), is mounted on the motor shaft and driven at 4000 to 6000 or more r.p.m. As a result, the ball vibrates, begins occasionally to move off a floor supporting, rolls for a few feet in a gentle arc, suddenly changes direction, encounters a small obstacle, suddenly shifts to another direction, moves rapidly—stops with no apparent reason, and shifts to another track, all without any human intervention whatsoever.

The eccentrically loaded rotating device may be attached to the rotating shaft of any small conventional motor, electric or spring-wound. It may even be fastened to an inertia type motor which is started by pulling a cord or the like, if desired. Preferably, the motor is not very heavy as extra mass tends to dampen the vibrational drive. The manner of attachment is not critical but one aspect of this invention involves use of a particularly convenient and effective mounting element. In some respects, the operation of the eccentrically loaded device is quite similar to operation of the vibrators used in massaging or tamping implements and the like. However, the application, as well as the results, are much different and quite unexpected.

A particular object of the invention, then, is to devise a mobile ball or wheel having unusual energy and unpredictable motions, while employing simple and relatively very inexpensive elements. A spherical ball is preferred. A further object is to so construct the ball that neither the source nor the nature of its drive mechanism is readily apparent to the ordinary observer. Therefore it becomes particularly interesting, either as a toy, as a mobile display device, or as a demonstration vehicle for the physics of unconventional motions. These and other objects will appear more clearly after a detailed description of a typical embodiment. For this latter purpose reference will next be made to the accompanying drawing, wherein FIGURE 1 is a vertical sectional view through a typical sphere embodying a driving device, the section being approximately perpendicular to the driving axis and more or less along line 1—1 of FIGURE 2.

FIGURE 2 is another vertical sectional view taken approximately at right angles to the view of FIGURE 1, more or less along line 2—2 of FIGURE 1.

FIGURE 3 is a fragmentary view of a modified device wherein the driving motor is of a spring driven type.

Referring first to FIGURE 1, there is shown a ball 11, preferably formed in two hemispheres of which one is shown quite fully at 13 and the other only fragmentarily at 15. These hemispheres are made of a light weight material such as cork, balsa wood, or foamed plastic such as polyurethane, polystyrene, or foam rubber, and the like. In assembly the parts may be secured together by adhesive, by a surrounding band or by releasable fasteners. In a specific example, hemispheres of polystyrene foam, six inches or so in diameter, and weighing less than about one ounce each, have proved to be very satisfactory for use with a small battery operated motor. However, these dimensions and weights are only by way of illustration. The two hemispheres are equipped with means not shown so that they can be fastened together in any suitable manner. This is desirable so they can be pulled apart when it is desired to change batteries, etc. Alternatively, an opening, with suitable closure, can be provided in one hemisphere.

Each hemisphere is hollowed out to accommodate approximately half the mass or weight of the driving device, as shown at 17 in the left hemisphere 13, FIGURE 2, and at 19 in the right hemisphere 15.

The driving device illustrated is a small and inexpensive 3-volt D.C. electric motor 21, capable of operating at high rotational speed, e.g. 4000 to 10,000 or more r.p.m., on two conventional 1½ volt flash light batteries. A pair of such batteries are shown at 23, 25, being connected by leads 26, 28, in series to the motor and with a switch element 27 adapted to turn the motor on and off as desired. The latter has a projecting actuating rod 29 located in a channel 30. It is equipped with a small head 31, located in a suitable recess 33 near or at the surface of the ball.

The arrangement may be such that the switch is quite invisible—in fact it may be made completely so by recessing the rod 29 and its head into channel 30 which is formed in the flat surface or more or less parallel to the flat face 35 of one of the hemispheres, e.g. surface 15, FIGURE 2. The arrangement is such that the switch can be turned on by light pressure at a point known only to the operator. For discontinuing operation, the switch rod may have a soft spongy piece of rubber in the form of a washer 37 under the head 31. This material, which in preferred form is slow to recover after deformation, will not immediately open the switch, due to friction of the channel 30 in which the rod must slide. Hence, when the head 31 is pushed in, by application of thumb pressure to the ball surface outside and opposite the head 31, the motor will start operating and will continue in operation until the compressed washer 37 finally expands and withdraws the switch rod far enough to interrupt the electric circuit.

Alternatively, if desired, the rod 29, or a connection thereto, may extend to the opposite side of the ball to a point near 41 and be provided with another concealed head there. The operator can then push one end to actuate the switch and start the motor. When he wants to stop the operation, he picks up the ball and pushes on the other end, or on the surface of the ball at 41. Thus control of the motor is complete with no control elements showing. However, in many cases, the head 31 may be visible without being particularly noticeable and it is capable of being pulled as well as pushed, manually.

On the end of the rotatable motor shaft 45 is a preferred attachment device for the eccentric. This is a rubber bushing 47 of such internal dimensions and elasticity that it grips the shaft tightly by elastic constriction. An eccentric, 46, shown in the form of a thick metal disc or short cylinder, which eccentric may weigh about or almost as much as the motor, or even more, is provided with a hole which tightly and frictionally receives and holds the rubber bushing 47. Thus, the bushing 47 is an annular resilient connector, and a very convenient one, between the motor and the eccentric. This facilitates assembly of the parts.

The two batteries 23, 25, and the motor 21, are mounted together in very simple fashion by wrapping a band, e.g. of friction tape 49 or equivalent, around the three of them. The hemisphere 13 is hollowed out to take about half of the eccentric-motor-battery assembly, while the other hemisphere 15 is hollowed out to receive the other half. Space 51 is specially cut out in hemisphere 13 so that the eccentric 46 can rotate freely without obstruction.

The particular position of the eccentric with respect to the center of gravity of the whole assembly, including the ball, does not appear to be critical. However, its mass and eccentricity or radius of gyration preferably should be such that the ball on a hard surface will actually vibrate enough to jump clear of the surface on which it is supported, at least on occasional instances. In other words, its moment of inertia is quite substantial, in proportion to the mass of the whole device. The eccentric, of course, need not by a cylindrical member or even round in shape, as long as its mass and radius of gyration are adequate, in relation to the weight and size of the ball assembly. A substantial moment of inertia, i.e. the integrated product of mass and radius of gyration, is needed to impart sufficiently violent motion for good mobility. It is preferred that the eccentric weight per se comprise at least 10% of the total assembly, desirably 15% to 40%. However, it performs reasonably well at lower proportions down to 5%, or even less in some instances. A lighter weight with a greater eccentricity can replace a heavier weight with small eccentricity, obviously. The eccentric mass must not be so heavy or its moment of inertia so great, however, that the ball will revolve in preference to having the motor drive the eccentric. Moreover, the motor must be of sufficient power to turn the eccentric at a fairly high rate, e.g. at least 600 r.p.m. and preferably several thousand r.p.m. The drive from motor to eccentric may be direct or through reduction gearing. For economy and simplicity, direct drive is much preferred. The arrangement is such that the combination of velocity of rotation and radius of gyration of the eccentric weight about its supporting shaft is enough to impart energetic rolling action to the device, when the motor is operating.

Referring now to FIGURE 3, the arrangement there is similar in general to that of FIGURE 1, except that a spring-wound motor 61 replaces the battery and motor assembly of FIGURES 1 and 2. The winding shaft 62 is projected through a bore or channel in one of the hemispheres, similar to the channel 30 in FIGURE 1, and a key, not shown, which may be removable if desired, is used to wind up the motor, as is well known. A gear train 63, 65, of conventional type, and comprising as many speed increasing elements as needed, is interposed between the mainspring 67 and the eccentrically loaded shaft 69. The latter supports an elastic bushing 71, much like bushing 47 previously mentioned, which in turn supports the rotatable eccentric weight 73, similar in general to the arrangement in FIGURES 1 and 2. The hemisphere 83 is hollowed out to receive part of the assembly and the other hemisphere, not shown, but similar to the arrangement of FIGURES 1 and 2, is also hollowed out to receive the rest of the drive mechanism. The winding shaft 62 is turned by a conventional removable key, suitable ratchet means for holding the spring in tension as it is wound, such means being so well known that illustration and description are not necessary.

Instead of the spring-wound motor of FIGURE 3, an inertia type motor, embodying a flywheel, may be used. However, the eccentrically weighted rotating member and the flywheel of an inertia motor oppose or tend to dampen each other in certain respects, as will be obvious to those skilled in the art. Other types of prime mover, such as already described above, are usually preferred.

It will be obvious that many other types of arrangements may be made which accomplish the same results, using the principles of the invention but varying certain elements. Essentially, the invention makes use of impulses of energy which are relatively violent and which are in the form of rotational vibration to give driving energy to the ball. As noted above, a wheel or cylinder, capable of rolling freely, may be substituted for the ball, though usually not as active or as versatile in movement. The ball is normally much preferred, its movements being more interesting and varied, even to the point of being sensational. The ball, however, need not be perfectly spherical. It may be in the form of a prolate spheroid (football) or an oblate spheroid (flattened at the poles, relatively speaking) and it may vary in other respects, if desired, from truly spherical shape. The rolling device, whether wheel or ball, should have at least one circumference of substantially constant radius in a plane passing approximately through its geometrical center and its geometrical center should substantially coincide with its center of gravity. Preferably, several of its circumferences, in planes at various angles to each other, have the same properties of constant radius and passing through the center, though these radii need not all be equal.

While the unit is described as being made up of two hemispheres, each hollowed out to receive part of the drive mechanism, it may be made up otherwise, e.g., in quarters, orange segments, etc. It may be made as an essentially whole sphere hollowed out of a single piece and plugged, etc. The important thing is that the mechanism be located and proportioned as to give it active motion of a type that will vary and cause excited and unpredictable movement as the axis of the eccentric weight changes position and direction. The drive mechanism, including the eccentric mass, is preferably centered approximately at the center of gravity.

It is known to use rotatable and unevenly balanced elements to simulate dancing in toy figures. However, the present invention is not to be confused therewith since it causes bodily movement of a rolling character with frequent and dramatic changes of velocity, direction and orientation. These are not known in rolling devices, particularly in balls, so far as applicants are aware, in the prior art. The device of this invention requires no assistance in starting its rolling from outside sources. Its entire motion preferably is derived from its self-contained driver mechanism.

What is claimed is:

1. A round rolling device capable of self driving through energetic and erratic motions, said device having a circumference of substantially constant radius in at least one plane passing approximately through its center of gravity, and a completely independent drive mechanism supported within said rolling device but free of positive driving connection therewith, said mechanism comprising a prime mover, a shaft rotatable by said prime mover, said shaft being rotatable both with respect to said prime mover and said rolling device and an eccentrically mounted weight fixed to said shaft, said weight having a moment of inertia large enough to cause said energetic and erratic motions.

2. Device according to claim 1 in the form of a ball.
3. Device according to claim 1 in the form of an essentially spherical ball.
4. Device according to claim 1 wherein the prime mover is an electric motor.
5. Device according to claim 1 wherein the prime mover is a spring wound motor.
6. Device according to claim 1 which includes a battery driven electric motor, an eccentric driven by the motor which weighs substantially as much as the motor, and control means concealed in the ball for starting and stopping operation of said motor.
7. Device according to claim 1 comprising two hemispheres of light weight porous material each hollowed out to receive about half the mass of the drive mechanism.
8. Device according to claim 1 wherein the rolling device is a ball and the eccentrically mounted weight has a moment of inertia at least substantially equal to that of the ball minus the drive mechanism.
9. Device according to claim 1 wherein the eccentrically mounted weight has a mass of 10 to 40% that of the total device and is driven at a velocity of at least several revolutions per second and has a radius of gyration about its supporting shaft sufficient to impart energetic rolling movement to the device when driven by the prime mover.

References Cited

UNITED STATES PATENTS

| 2,977,714 | 4/1961 | Gibson | 46—207 X |
| 676,297 | 6/1901 | Balding et al. | 46—207 |
| 2,949,696 | 8/1960 | Easterling | 46—243 |

LOUIS G. MANCENE, Primary Examiner.

C. R. WENTZEL, Assistant Examiner.

U.S. Cl. X.R.

46—207, 211